United States Patent [19]
Burns

[11] Patent Number: 4,986,128
[45] Date of Patent: Jan. 22, 1991

[54] IN-LINE PRESSURE GAUGE

[75] Inventor: Marvin D. Burns, Milbury, Ohio

[73] Assignee: The DeVilbiss Company, Toledo, Ohio

[21] Appl. No.: 455,621

[22] Filed: Dec. 22, 1989

[51] Int. Cl.$^5$ .................................................. G01L 7/16
[52] U.S. Cl. ........................................ 73/744; 73/730; 116/272
[58] Field of Search ................ 73/744, 730, 146.8; 116/34 R, 272, 266

[56] References Cited

U.S. PATENT DOCUMENTS

| | | | |
|---|---|---|---|
| 960,341 | 6/1910 | Kincaid | 116/70 |
| 1,038,803 | 9/1912 | Vaughn | 116/264 |
| 1,156,268 | 10/1915 | Bromberg | 73/146.8 |
| 1,334,874 | 3/1920 | Miller et al. | 116/34 R |
| 1,622,341 | 3/1927 | Platt | 116/34 R |
| 3,342,201 | 9/1967 | Grogono | 137/112 |
| 3,670,688 | 6/1972 | Seaberg | 73/146.8 |
| 3,678,881 | 7/1972 | Shinn | 116/70 |
| 3,691,981 | 9/1972 | Rao | 116/70 |
| 3,910,222 | 10/1975 | Metivier | 116/70 |
| 4,072,048 | 2/1978 | Arvan | 73/146.8 |
| 4,072,126 | 2/1978 | Kemp | 116/125 |
| 4,136,560 | 1/1979 | Gellos | 73/146.8 |

Primary Examiner—Donald O. Woodiel
Attorney, Agent, or Firm—MacMillan, Sobanski & Todd

[57] ABSTRACT

An improved pressure gauge which constantly indicates gas pressure in a line. A tubular adapter is attached in a gas supply line. The adapter is provided with a passage which permits gas to flow into an annular chamber defined between an outer sleeve secured to the line adapter and a tubular plunger. The plunger, an annular seal, and a spring are retained on the adapter by the sleeve. The seal, plunger and spring are arranged concentrically about the adapter. Gas pressure entering the chamber forces the seal to engage the plunger which, when sufficiently high, compresses the spring, moving and exposing the plunger. The outer surface of the plunger is provided with numbers and lines thereon which indicate gas pressure at the gauge.

5 Claims, 1 Drawing Sheet

IN-LINE PRESSURE GAUGE

TECHNICAL FIELD

This invention relates in general to devices for measuring fluid pressure and in particular to an improved gauge which constantly indicates the pressure of gas in a line or hose.

BACKGROUND ART

There are numerous devices available which are capable of measuring gas pressure, such as an air compressor pressure gauge or a combined air valve and gauge typically found at automotive/service stations. These devices are capable of visibly indicating gas pressure to an operator. An air compressor gauge typically is mounted on an air tank away from the outlet of the compressed air supply line. For industrial painting installations, a building will typically have a compressed air distribution system. The system may include a wall mounted pressure gauge and a pressure regulator at each painting location. During painting, the pressure gauge may not be visible to the operator. Prior art in line pressure gauges have been too bulky and heavy to place in the air hose adjacent to the spray gun where it is readily visible to the operator.

Vehicle service stations typically use compressed air hoses for filling tires. Tires are filled with a valve and gauge assembly on the end of the hose which prevents air loss and indicates the air pressure in the tire. The valve and gauge assembly has the gauge mounted to one side of the air flow path through the supply line to the valve. Pressure gauges of this type require additional components which add to the complexity, bulk, and price of the device if one so desires to be able to measure the pressure of a fluid flowing through the line.

DISCLOSURE OF INVENTION

The invention relates to an in line gauge which constantly indicates the pressure of a gas in a line or hose. A line connector is attached to a supply line through which a pressurized gas flows. The line adapter is provided with ducts which permit gas to flow into a chamber defined by an outer sleeve secured to the line connector. Housed within the sleeve are an annular seal, an annular plunger and a spring assembly. The seal, plunger and spring are arranged concentrically about the line adapter. When pressurized gas is present in the line adapter, a portion of such gas passes through the ducts into the chamber. The gas pressure in the chamber forces the seal to engage the plunger which, when sufficiently high, compresses the spring by an amount proportional to the gas pressure, exposing the plunger from within the sleeve. The plunger is provided with numbers thereon which indicate the pressure of the gas in the connector.

It is an object of the invention to provide an improved in-line gas pressure gauge which is simple and inexpensive in construction and operation.

Other objects and advantages of this invention will become apparent to those skilled in the art from the following detailed description of the preferred embodiment, when read in light of the accompanying drawings.

BEST MODE FOR CARRYING OUT THE INVENTION

Figure 1:
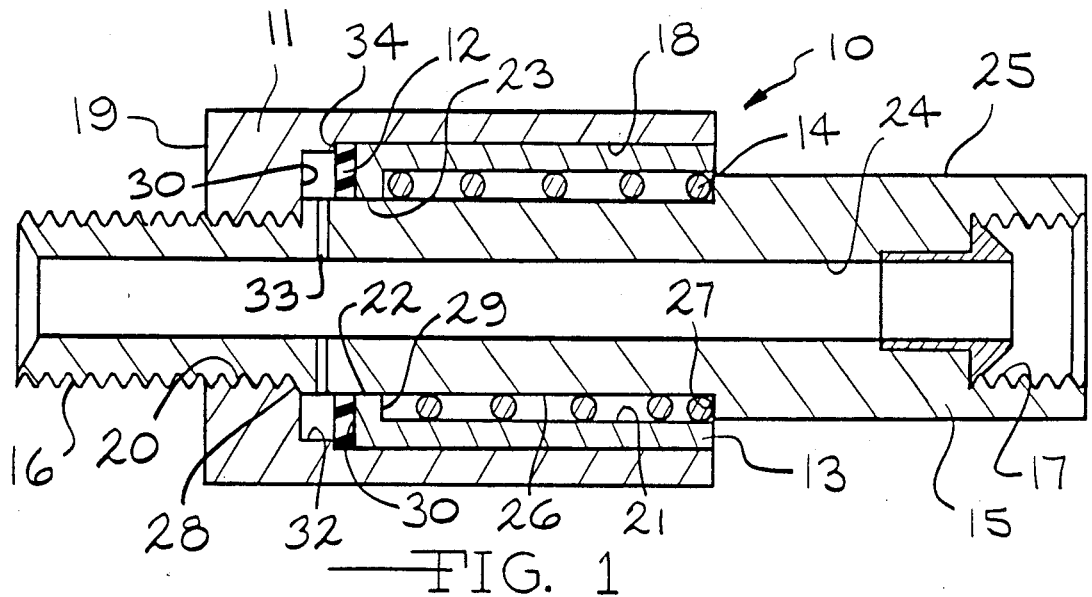
FIG. 1 is an enlarged cross-sectional view showing the in-line pressure gauge of the present invention in an un-actuated condition.

Referring to the drawings, there is illustrated in FIG. 1 an in-line gas pressure gauge, indicated generally at 10. The in-line pressure gauge 10 includes a sleeve 11, a seal 12, a plunger 13, a spring 14, and a tubular adapter 15. As is well known, air supply hose (not shown) are typically sold in various lengths with a threaded male connector on one end and a threaded female connector on the other end. The tubular line adapter 15 has a threaded male end 16 and a threaded female end 17 for attachment, for example, between two hose sections or between a hose section and an attached device such as a spray gun (not shown).

Figure 3:
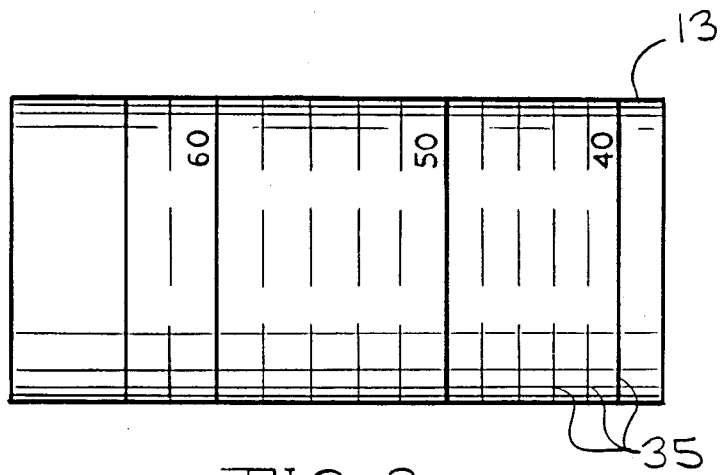
FIG. 3 is an enlarged plan view showing exemplary pressure indicating numbers on a plunger in accordance with this invention.

The sleeve 11 is a generally solid tubular piece having a cylindrical recess 18 formed therein having a flat end surface 19 through which a threaded central opening 20 is formed. The plunger 13 is tubular having a cylindrical recess 21 formed therein and having a flat end surface 22 through which a central opening 23 is formed. The inner diameter of the recess 18 formed in the sleeve 11 is complimentary to the outer diameter of the plunger 13 so that the plunger 13 is telescopically moveable therein. The plunger 13 is provided with numbers and lines 35 thereon, as shown in detail in FIG. 3, which visually indicate to an operator the pressure of gas in the pressure gauge 10. Or, the pressure indicating indicia may be placed on a large diameter portion 25 of the adapter 15 so as to be progressively covered by the plunger 13 as the measured air pressure increases.

The line adapter 15 is tubular having an axial opening 24 formed therethrough. The adapter 15 has a stepped cylindrical outer surface with the predetermined large diameter portion 25 adjacent the end 17, an intermediate diameter portion 26 between the portion 25 and the end 16 and a smaller diameter at the threaded end 16. A step 27 lies between the intermediate portion 26 and the end 17 and a step 27 lies between the end 16 and the intermediate portion 26.

The individual components of the gauge are easily assembled. First, the spring 14 is placed over the end 16 of the adapter 15 until the end coil thereof rests against the step 27. Next, the plunger 13 is inserted over the spring 14 until an inner surface 29 of the flat end 22 thereof abuts the other end of the spring 14. The annular seal 12 then is positioned on the adapter 15 adjacent an outer surface 30 on the flat plunger end 22. The sleeve 11 is now threaded onto the threaded end 16 of the adapter 15 until a surface 31 on the sleeve 11 abuts the adapter step 28. When assembled, the seal 12 is spaced from the sleeve surface 31 to define a chamber 32. Adjacent the step 28, one or more passages 33 connect the chamber 32 with the axial adapter opening 24.

Figure 2:
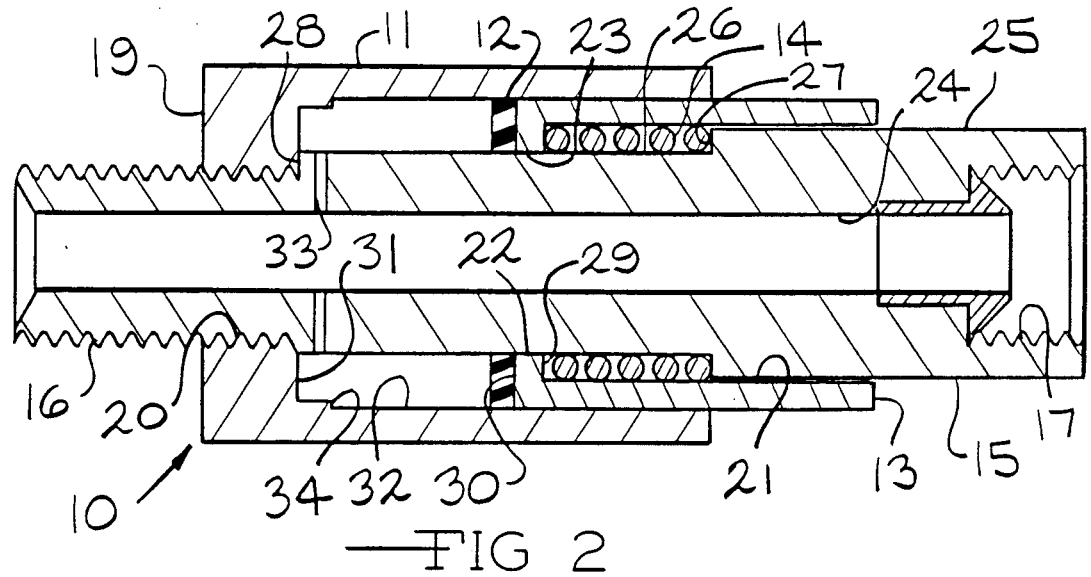
FIG. 2 is a cross-sectional view similar to FIG. 1 showing the in-line pressure gauge in an actuated condition.

Referring to FIGS. 1 and 2, the operation of the assembled in-line pressure gauge 10 will now be described. When there is no pressurized gas being supplied to the gauge 10, the spring 14 normally forces the plunger 13 and seal 12 to a non-actuated condition, as illustrated in FIG. 1. If desired, the sleeve opening 18 may be shaped to form a step 34 adjacent the surface 30 for limiting movement of the seal 12 and the plunger 13. During this condition, none of the pressure indicating numbers and lines 35 on the plunger 13 are visible to the operator since the plunger 13 is fully retracted within the sleeve 11. However, as soon as pressurized gas is supplied to the gauge 10, the gas simultaneously flows through the passages 33 to the chamber 31. The gas in the chamber 31 will exert a force on the seal 12 which in turn causes the plunger 13 to compress the spring 14, as illustrated in FIG. 2. The plunger 13 now extends past the end of the sleeve 11 and the numbers and lines 35 thereon indicate the gas pressure in the line attached to the gauge 10.

The gauge 10 may be calibrated to indicate a desired pressure range. If the spring 14 is not compressed when the plunger 13 is in the position illustrated in FIG. 1, the lower end of the range will be a pressure of zero. The upper end of the indicated pressure range will be determined by the properties of the spring 14. If the spring 14 is partially compressed when the plunger 13 is retracted as shown in FIG. 1, the force of the compressed spring must be overcome before the plunger 13 will move and the gauge 10 will indicate when line pressure falls within a range, such as from 40 psi to 60 psi, as illustrated by the exemplary numbers and lines 35 shown on the plunger 13 in FIG. 3. Again, the total indicated pressure range will be determined by the properties of the spring 14.

In accordance with the provisions of the patent statutes, the principle and mode of the operation of the invention have been described and illustrated in its preferred embodiment. Nevertheless, it will be understood that the invention may be practiced otherwise than as specifically described and illustrated without departing from the scope and spirit of the following claims.

I claim:

1. An improved pressure gauge for measuring gas pressure in a line having an end comprising, in combination, a tubular adapter having first and second ends, said adapter having a first diameter at said first end, an intermediate diameter portion between said first and second ends and a larger diameter at said second end with a first step formed between said first end and said intermediate diameter portion and a second step formed between said intermediate diameter portion and said second end, wherein said first end is externally threaded, means for attaching one of said adapter ends to said line end, said adapter having an axial opening maintaining gas flow through said line and said adapter, means for defining a closed annular gas chamber extending coaxially about said adapter, a tubular sleeve having a stepped opening with an internally threaded first end threaded onto said first adapter end to abut said first step, said sleeve defining a portion of said chamber, passage means connecting said chamber with said axial opening for allowing gas to flow therebetween, a tubular plunger extending coaxially about said adapter, means for moving said plunger in an axial direction on said adapter in proportion to the gas pressure in said chamber, said plunger moving between a first position at a minimum gas pressure and a second position at a maximum gas pressure, and means responsive to axial movement of said plunger for indicating such gas pressure.

2. An improved pressure gauge, as set forth in claim 1, wherein said tubular plunger has an exterior diameter sized to telescope into said sleeve, and wherein said plunger has a stepped axial opening with a reduced diameter first end for sliding axially on said intermediate diameter portion of said adapter and a second larger diameter end for sliding on said larger diameter second adapter end.

3. An improved pressure gauge, as set forth in claim 2, and further including a spring positioned between said second adapter step and said first plunger end for urging said plunger toward said first position.

4. An improved pressure gauge, as set forth in claim 3, and further including annular seal means in said chamber abutting said first plunger end for means preventing gas leakage between said plunger and said adapter and between said adapter and said sleeve as said plunger moves between said first and second positions.

5. An improved pressure gauge, as set forth in claim 3, wherein said plunger is retained completely within said sleeve when said plunger is in said first position.

* * * * *